Dec. 6, 1932.    J. W. ORD    1,890,337
IRRIGATION SYSTEM
Filed Nov. 10, 1930    2 Sheets-Sheet 1
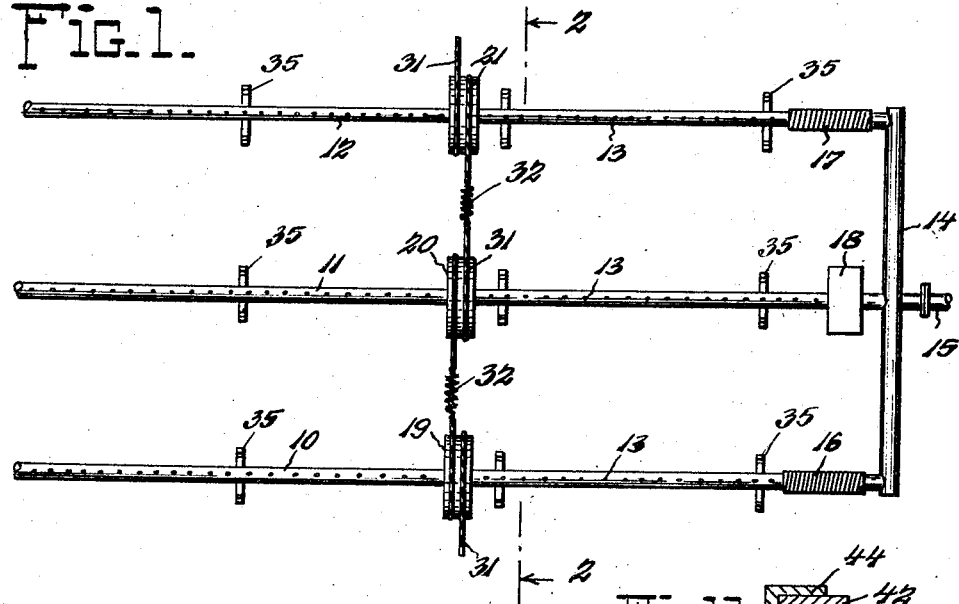
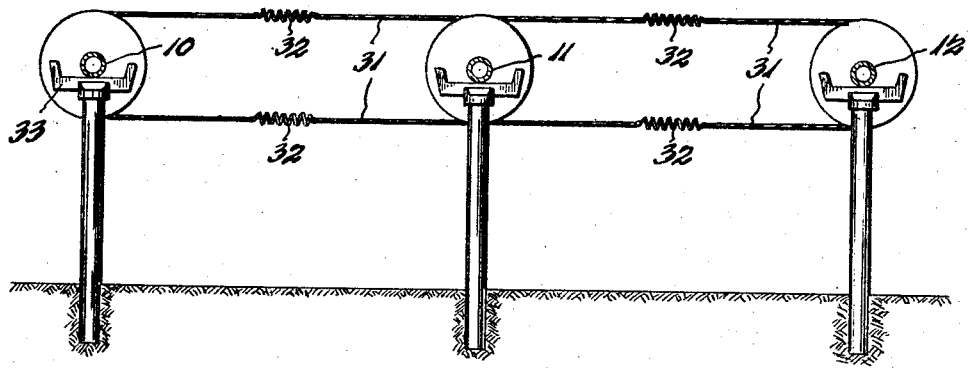
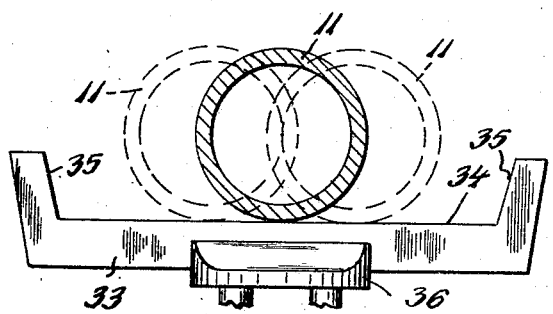
Inventor
JOHN W. ORD.
By Robert Cobb
Attorneys Dec. 6, 1932.  J. W. ORD  1,890,337
IRRIGATION SYSTEM
Filed Nov. 10, 1930  2 Sheets-Sheet 2
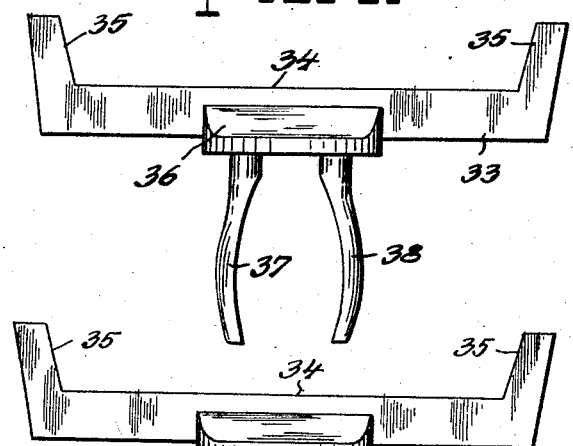
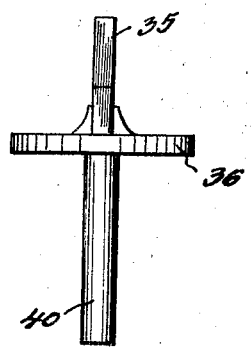
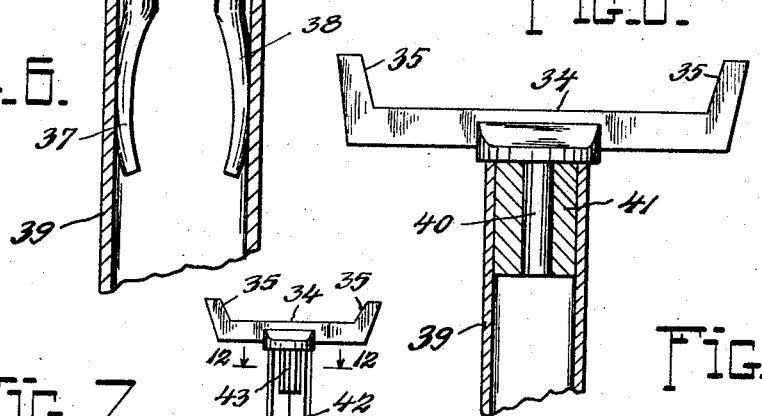
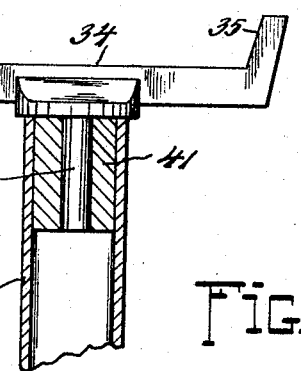
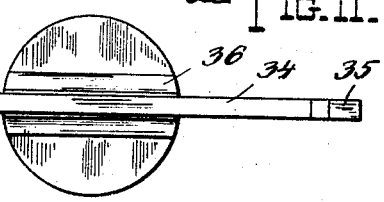
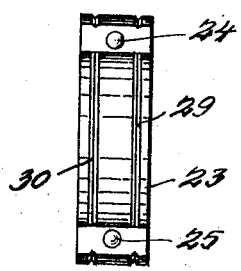
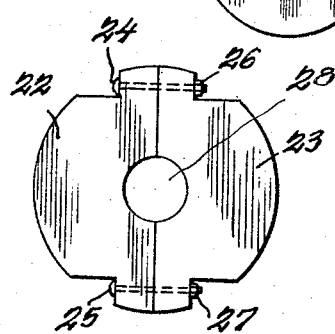
Inventor
JOHN W. ORD.
By Robb & Robb
Attorneys Patented Dec. 6, 1932

1,890,337

UNITED STATES PATENT OFFICE

JOHN W. ORD, OF CLEVELAND, OHIO

IRRIGATION SYSTEM

Application filed November 10, 1930. Serial No. 494,680.

In agricultural operations, such for example, as truck farming, vineyards, and the like, where the acreage is usually relatively small, it is often the practice to install sprinkling systems which will serve to irrigate the particular area under cultivation independently of natural rainfall. For such purposes, pipe lines are laid suitably connected with a source of water and provided with openings whereby the cultivated area may be subjected as desired to sprays of water issuing from the pipe lines and distributed over the desired surface of the ground. To assure an even distribution of this water, it is customary to mount the pipe lines so they will be capable of being rotated or oscillated back and forth so that the water spray will be directed through an arc and over a given amount of ground adjacent each side of the pipe line; and by multiplying the number of pipe lines as many times as may be needed, it is apparent that the area of the ground under cultivation may be effectively sprayed by such instrumentalities as often as natural weather conditions may make such watering desirable. It is also customary to cause such pipe lines to be turned back and forth through the provision of an apparatus known in this art as an oscillator, of which several types are on the market, it being the practice to connect such an oscillator to each pipe line, the pipe line being mounted on suitable supports which will permit rotation of the pipe for uniform distribution of the water spray as the pipe turns under the influence of the oscillator.

The present systems of this kind are open to the objection, however, that there has not been devised a means which will permit efficient utilization of the power available from such oscillator, it being the practice in installations of the prior art, to provide an oscillator for each pipe line; and since such oscillators represent a considerable outlay of money, they being relatively expensive, to provide adequate irrigation of an area requiring several such pipe lines means the investment of a rather substantial amount of capital. Also in such installations the speed of rotation is not uniform, more spray being directed horizontally than vertically as the pipe turns.

In accordance with the present invention, there is provided a supporting means which, through elimination of virtually all friction between the pipe and the support, permits ready turning of a pipe line, and also provides means whereby several pipe lines can be connected together so that while resting upon the improved supports, they are capable of being readily turned by one oscillator, or else the length of pipe line which can be efficiently handled by a single oscillation is materially increased.

The invention will be more readily understood by reference to the attached drawings, wherein Figure 1 represents a plan view of an installation made in accordance with this invention, there being illustrated three pipe lines connected together.

Figure 2 represents a sectional view along the line 2—2 of Figure 1, looking in the direction of the arrows.

Figure 3 is a detailed view of a section of one of the pipes resting upon an improved support forming a part of this invention, and indicating the motion of the pipe upon the support.

Figure 4 represents a front elevation of one form of support designed for use in installations of the present character.

Figure 5 is an end view of a modified form of support.

Figure 6 is a view of the support of Figure 4 showing the support mounted in a carrying member therefor, the carrying member being shown in section.

Figure 7 is a top view of the support of Figure 5.

Figure 8 is a side elevation of the support of Figure 5, showing the support mounted in a carrying member provided therefor, the carrying member being shown in section.

Figure 9 is a front elevation of one of the connecting members employed in accordance with this invention.

Figure 10 is an end elevation of the member of Figure 9.

Figure 11 is a side elevational view of a supporting member mounted on an angle carrying member, and Figure 12 is a sectional view on the line 12—12 of Figure 11.

Referring more particularly to the drawings, there is illustrated an installation of three pipe lines, although it will be understood that the number of these pipe lines may be increased or diminished as necessitated by the area of the ground to be irrigated, the pipe lines being indicated at 10, 11, and 12, the said lines 10, 11, and 12 being provided with a series of apertures 13, which serve as sprinkling holes, water being supplied to the pipe lines through the distributing head 14 connected by line 15 to a suitable source of water, not shown.

Pipes 10, 11, and 12 are mounted for rotation, pipes 10 and 12 rotating through flexible connections 16 and 17 respectively, which connections, conveniently formed of rubber hose, serve as water tight coupling members while permitting rotation of the pipes 10 and 12. Pipe 11 is illustrated as being connected to an oscillator diagrammatically shown at 18, this oscillator being of the well known type which is actuated by pressure of the water flowing into it, the motion of the oscillator 18 being transmitted in well known manner to the pipe line 11. Each of the pipe lines is illustrated as being provided with a pulley members 19, 20, and 21, each of which pulley members is like the others, and therefore only one of them needs to be described.

Each of these pulley members is formed of the sections 22 and 23, see Figure 9, the sections being separable but normally secured together in suitable manner as for example, by bolts 24 and 25 provided with the nuts 26 and 27. Such a securing means will permit a certain amount of adjustment between the halves 22 and 23 of the pulleys, so that pipe lines of varying diameter may be accommodated. These pulleys are conveniently formed of hard wood, or of a light, non-rusting metal of any desirable form, and are shaped as indicated at 28 to permit the fitting of the pipe line between the sections of the said pulleys. Each pulley is provided with grooves 29 and 30 extending around the periphery thereof, there being cables 31 wrapped around these grooves, these cables being connected end to end in sets of two. Springs 32 are provided for maintaining the cables taut. It is understood that each end of the final cable of the series is secured against slipping to its pulley in any manner which will be apparent.

The pipe lines are carried on supporting brackets illustrated at 33, which constitute important elements in this invention. These brackets are formed of metal, preferably of a rust resisting character, although this is not essential since the operation of the pipes upon them will keep the bearing surfaces clean and smooth. Each support 33 is formed with a smooth straight bearing surface or edge 34 with upturned ends 35, the edge 34 forming a flat plane upon which each pipe line is free to roll in a relatively unobstructed manner and with a minimum of friction, since there is substantially only point contact between the round pipes and the flat plane 34. These supporting brackets 33 may be formed with a supporting body 36 conveniently provided with resilient prongs 37 and 38 which are adapted to engage in tight frictional engagement a hollow carrying member 39, which in turn is supported in the ground; or the member 36 may be provided with a single carrying rod 40 which is adapted to fit closely into a plug 41 which is tightly forced into a hollow carrying member such as 39, previously described. The supports are arranged as closely together as necessary for adequate carrying of the pipe line, the members 39 being forced into the ground so that the surfaces 34 will be parallel to each other and will be in a horizontal plane so that the pipe line carried thereby will be free to roll along these horizontal supporting members; and it may be here noted that the speed of rotation of the pipes is uniform in all portions of the arc through which the pipe is rotated, thus assuring uniform sprinkling of the entire ground area.

In Figures 11 and 12 the pipe supporting member 34 is shown as mounted upon the carrying member 42 formed of angle iron or any other angular material. To secure the member 34 to the angular support 42 there is provided a pair of prongs 43 and 44, the prongs diverging from the member 34 and being shaped angularly to conform to the contour of the carrying member 42, a firm grip being thereby obtained between the prongs 43 and 44 and the member 42. The member 42 is mounted uprightly in the ground, so that the member 34 presents a flat plane surface to a pipe line rotating thereon.

It will be seen that the cables connecting the pulleys will be maintained taut by the provision of the springs, and since each pipe line is supported upon the smooth flat planes 34, frictional opposition to the turning of the line will be reduced to a minimum, and consequently, the available power of each oscillator 18 is efficiently utilized and one such oscillator is enabled to turn a plurality of pipe lines, whereas heretofore it has been customary to install one oscillator for each line; or, obviously, one oscillator will be adapted to turn a much longer length of pipe line than has heretofore been regarded as possible owing to elimination of friction on the bearing.

Figure 3 illustrates the position of the pipe line 11, for example, as it rolls upon one of its supporting members 37; the positions which the pipe 11 takes being indicated by dotted lines. As a matter of fact, each pipe line will be oscillated so that the apertures 13 will travel through an arc equal to approximately a third of the circumference of a circle, this amount of oscillation permitting the maximum spread and distribution of the spray issuing from the apertures 13.

It will be apparent that installations of this character will very economically and efficiently irrigate a desired area for as long an interval and as frequently as may be desired; and since it will be apparent that the points of friction between the pipe lines and the supporting members are reduced to a minimum, the effort required by a given oscillator to turn the lines is reduced to a minimum, and therefore, the available power of a given oscillator can be utilized in the efficient operation of a number of pipe lines instead of being consumed in overcoming frictional engagement between a line and its supporting members as has heretofore been the case. It will also be apparent that while the above specifically illustrated and described embodiment of the invention represents a typical form of installation, it will be apparent that changes in details thereof may be made without departing from the inventive concept; and it will be accordingly understood that it is intended and desired to embrace within the scope of this invention such modifications and changes as may be required to adapt it to varying conditions and uses.

Having thus described my invention, what I claim as new and desire to secure by Letters Patent of the United States, is—

An irrigation system comprising the combination with a plurality of apertured pipe lines adapted to deliver a spray of liquid therefrom, each of said pipe lines having a pulley fixed thereto, the adjacent pulleys being connected by individual cables, springs interposed in said cables to maintain the same taut, and an oscillating means for turning one of said pipe lines through a predetermined angle, thereby turning all of said pipe lines through said pulley and cable instrumentalities to uniformly distribute the liquid spray therefrom, of a plurality of supporting means for each pipe line, the said supporting means comprising a plurality of brackets having a smooth, straight flat pipe supporting edge along which the pipe is adapted to roll with a minimum of friction, each of the said brackets being provided with means for readily removably securing the bracket in a holder with the said pipe supporting edge in a horizontal plane, said means including a projection extending from said bracket and frictionally engaging said holder.

In testimony whereof I affix my signature.

JOHN W. ORD.